(12) United States Patent
Mlodzinski

(10) Patent No.: US 11,880,871 B2
(45) Date of Patent: Jan. 23, 2024

(54) METHODS AND SYSTEMS FOR PROVIDING CONTENT

(71) Applicant: Comcast Cable Communications, LLC, Philadelphia, PA (US)

(72) Inventor: Walter Mlodzinski, Doylestown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/520,422

(22) Filed: Nov. 5, 2021

(65) Prior Publication Data

US 2022/0318857 A1    Oct. 6, 2022

Related U.S. Application Data

(63) Continuation of application No. 14/250,947, filed on Apr. 11, 2014, now abandoned.

(51) Int. Cl.
| | |
|---|---|
| G06Q 30/00 | (2023.01) |
| G06Q 30/0241 | (2023.01) |
| H04N 21/81 | (2011.01) |
| H04N 21/845 | (2011.01) |
| H04N 21/458 | (2011.01) |
| H04N 21/8541 | (2011.01) |

(52) U.S. Cl.
CPC ........ *G06Q 30/0277* (2013.01); *H04N 21/458* (2013.01); *H04N 21/812* (2013.01); *H04N 21/8455* (2013.01); *H04N 21/8456* (2013.01); *H04N 21/8541* (2013.01)

(58) Field of Classification Search
CPC ................... G06Q 30/0207–30/0277

USPC .................................................. 705/14, 319
See application file for complete search history.

(56) References Cited

U.S. PATENT DOCUMENTS

| | | | |
|---|---|---|---|
| 2002/0007402 A1* | 1/2002 | Thomas Huston | G06F 16/9574 709/217 |
| 2005/0066357 A1* | 3/2005 | Ryal | H04N 21/4344 725/35 |
| 2006/0107302 A1 | 5/2006 | Zdepski | |
| 2007/0192875 A1* | 8/2007 | Yoon | G06F 21/10 713/165 |
| 2007/0276926 A1* | 11/2007 | LaJoie | H04N 21/812 709/219 |
| 2008/0010119 A1* | 1/2008 | Oliveira | G06Q 30/02 705/14.55 |

(Continued)

*Primary Examiner* — Matthew T Sittner
(74) *Attorney, Agent, or Firm* — Ballard Spahr LLP

(57) ABSTRACT

Methods and systems for providing content are disclosed. An example method can comprise receiving and/or storing first content comprising a first break point, receiving and/or storing second content comprising a second break point, providing the first content, and providing the second content at the second break point in place of the first content at the first break point. In an aspect, the first and second content can be first and second episode of a television show. The first content and the second content can comprise portions that may be commercials, alternate scenes, previews. The portions in the second content can be received at a later time. For example, the portions in the second content can be a newer version or updated version of the respective portions in the first content. The portions in the second content can be played when the first content is provided.

21 Claims, 8 Drawing Sheets

(56) References Cited

U.S. PATENT DOCUMENTS

| | | | |
|---|---|---|---|
| 2008/0091688 A1* | 4/2008 | Yun | G06F 16/27 |
| 2009/0210895 A1 | 8/2009 | Joo | |
| 2010/0118941 A1 | 5/2010 | Taylor et al. | |
| 2010/0238994 A1 | 9/2010 | Cakareski et al. | |
| 2010/0325657 A1 | 12/2010 | Sellers et al. | |
| 2011/0078002 A1 | 3/2011 | Leary et al. | |
| 2011/0211812 A1* | 9/2011 | Tzoukermann | H04N 21/23424 |
| | | | 386/250 |
| 2012/0030704 A1* | 2/2012 | Schiller | H04N 21/8543 |
| | | | 725/32 |
| 2013/0091251 A1* | 4/2013 | Walker | H04N 21/6125 |
| | | | 709/219 |
| 2013/0151534 A1* | 6/2013 | Luks | G06F 16/41 |
| | | | 707/742 |
| 2013/0205315 A1 | 8/2013 | Sinha et al. | |
| 2013/0318121 A1* | 11/2013 | Morton | G06F 16/435 |
| | | | 707/769 |
| 2014/0082651 A1* | 3/2014 | Sharifi | H04N 21/2353 |
| | | | 725/20 |
| 2015/0058872 A1* | 2/2015 | Earle | H04N 21/6175 |
| | | | 725/25 |

\* cited by examiner

Second Content

First Content

First Content with Second Portion (provided)

First portion

Second portion

N  Sixth Content (newest)

N-1  Fifth Content (provided)

N-2  Fourth Content (provided)

N-3  Third Content (provided)

N-4  Second Content (provided)

N-5  First Content (provided)

First portion

Second portion

METHODS AND SYSTEMS FOR PROVIDING CONTENT

CROSS REFERENCE TO RELATED APPLICATION

This application claims priority under 35 U.S.C. § 120 to, and is a continuation of, U.S. patent application Ser. No. 14/250,947, filed Apr. 11, 2014, the entire contents of which are hereby incorporated herein by reference in its entirety for all purposes.

BACKGROUND

The current method of playing a specific advertisement when providing content is dynamic advertisement insertion, meaning that the specific advertisement is separated from content and can be inserted into content by one or more advertisement channels. However, dynamic advertisement insertion can be cumbersome to manage. There is a need for more sophisticated methods and systems for playing a specific advertisement in any content according to content with the specific advertisement already inserted.

SUMMARY

It is to be understood that both the following general description and the following detailed description are exemplary and explanatory only and are not restrictive, as claimed. Provided are methods and systems for providing content. An example method can comprise storing first content comprising a first break point, storing second content comprising a second break point, providing the first content, and providing the second content at the second break point in place of the first content at the first break point.

As an example, the first content and second content can be a two episodes of a television series. The first content and the second content can comprise portions that can be commercials, alternate scenes, previews, etc. As an example, the first break point can comprise a start point for a portion (e.g., an advertisement) in the first content. The second break point can comprise a start point for a portion (e.g., an advertisement) in the second content. The portions in the second content can be received at a later time. For example, the portions in the second content can be a newer version or updated version of the respective portions in the first content. The portions in the second content can be played when the first content is provided.

In an aspect, the first content can further comprise a third break point, and the second content can further comprise a fourth break point. An example method can comprise storing first content comprising a first break point and a third break point, storing second content comprising a second break point and fourth break point, providing the first content, and providing the second content at the second break point in place of the first content at the first break point, and providing the first content at the third break point in place of the second content at the fourth breakpoint. As an example, the first break point can comprise a start point for an advertisement in the first content, and the third break point can comprise an end point for the advertisement in the first content. The second break point can comprise a start point for an advertisement in the second content, and the fourth break point can comprise an end point for the advertisement in the second content.

In another aspect, an example method can comprise storing first content comprising a first portion, storing second content comprising a second portion, generating a playlist comprising data related to the first and second portions, providing the first content, accessing the playlist to determine availability of the second portion, and providing the second portion of the second content in lieu of the first portion of the first content. In an aspect, the second portion can be more recent in time than the first portion. As an example, the content can comprise a television program, a movie, and the like. As another example, the first portion can be an advertisement in the first content, and the second portion can be an advertisement in the second content. In an aspect, the method can further comprise storing third content comprising a third portion, and updating the playlist with data relating to the third portion. As an example, the third portion can be an advertisement in the third content. In an aspect, the data relating to a portion can comprises one or more of, content type, content start point, content end point, content length, and the like.

In an aspect, an example system can comprise a storage system and a processor. The storage system can be configured for storing a plurality of content (e.g., first content, second content). The processor can be configured for determining one or more break points in the plurality of content (e.g., start and break points of advertisement in the first content the second content), and selectively providing either the first content or the second content based on the break points and temporal data (e.g., temporal data for the break points). In an aspect, determining one or more break points in the first content and the second content can comprise determining start and stop times of one or more portions (e.g., advertisements) contained in the first and second content. In another aspect, selectively providing the first content or the second content based on the break points and temporal data can comprise providing either a portion from the first content or a portion from the second content at one or more break points based on determining which portion is more recent.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
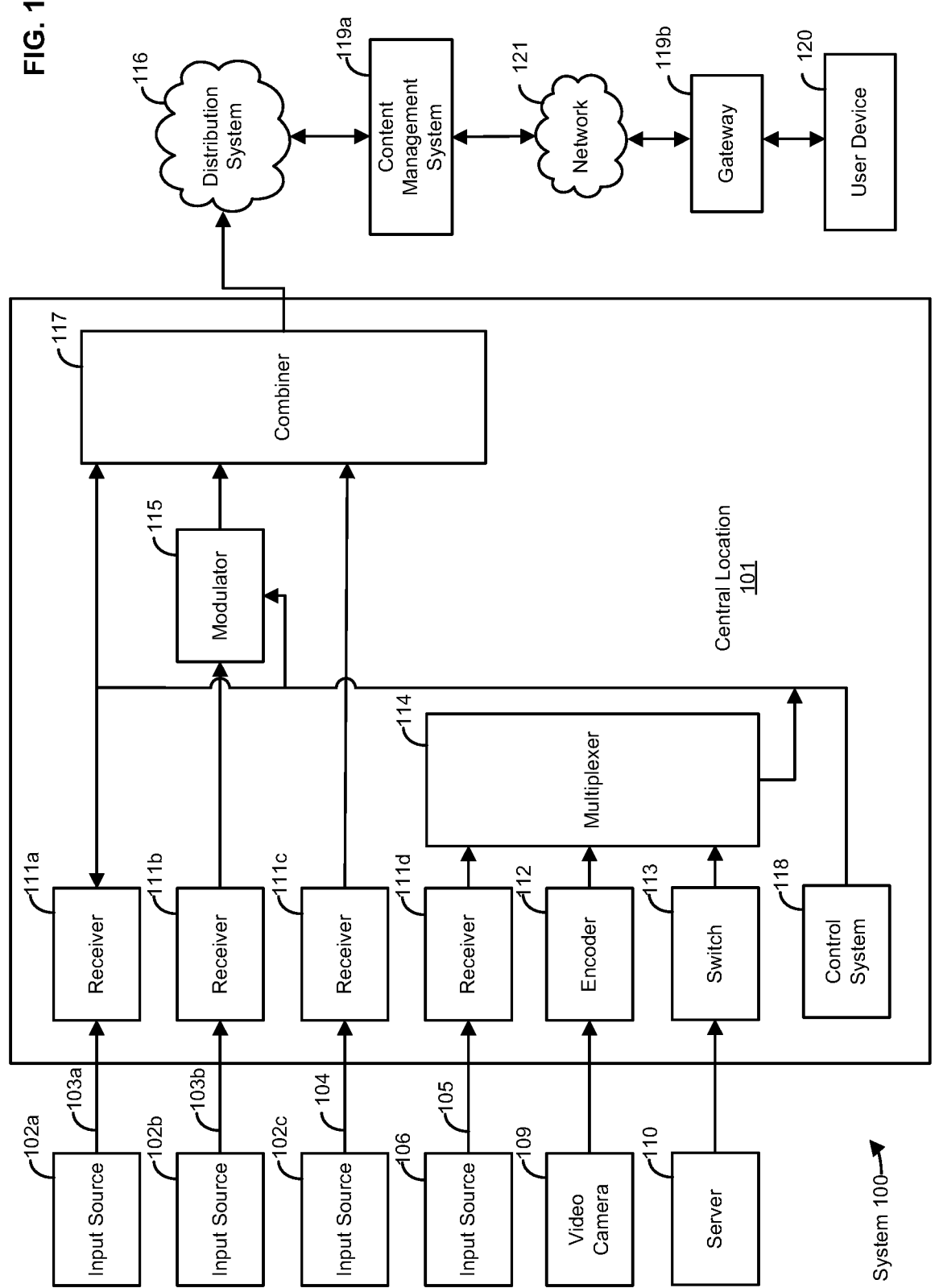
FIG. 1 is a block diagram of an exemplary system environment in which the present systems and methods can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for providing content are disclosed. In an aspect, a plurality of content (e.g., first content, second content, etc.) can be stored in a content management system, and each of the stored content can comprise a plurality of advertisements at different break points. In an aspect, the second content can be more recent in time than the first content. When the first content is provided, one or more advertisements in the second content can be played in lieu of one or more advertisements in the first content. Specifically, a processor in the content management system can be configured to determine one or more break points in the first content and second content and which advertisement is more recent, and selectively provide either the first content or the second content based on the break points and temporal data of the break points. By implementing the disclosed methods and systems, a specific advertisement from a more recent content can be played in place of an advertisement in older content.

FIG. 1 illustrates various aspects of an exemplary system in which the present methods and systems can operate. The present disclosure relates to methods and systems for providing content. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices, such as a video camera 109 or a server 110 (e.g., a video on-demand server, a pay-per-view server). The signals provided by the content sources can include a single content item or a multiplex that includes several content items.

As an example, content sources 102a, 102b, 102c can any type of provider capable of sourcing media, such as but not limited to a high speed data service provider, a cable, satellite, or broadcast service provider having capabilities to support linear (e.g., broadcast, switched digital video (SDV)) and non-linear (e.g., video on-demand (VOD)) modes of delivering television related services, a telephony service provider, for example, wireline, wireless, VoIP, cellular), a server, and the like.

The central location 101 can comprise one or a plurality of receivers 111a, 111b, 111c, 111d that are each associated with an input source. For example, MPEG encoders, such as encoder 112, are included for encoding local content or a video camera 109 feed. A switch 113 can provide access to server 110, which can be a Pay-Per-View server, a video on-demand server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment, such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

In an aspect, the distribution system 116 can distribute data from the central location 101 to a content management system 119a. As an example, the content management system 119a can poll (e.g., interrogate, query, communicate with, etc.) central location 101 to request a specific content and receive the specific content upon request. In another aspect, the central location 101 can notify the content management system 119a that a specific content is available and distribute the specific content to the content management system 119a.

In an aspect, a network 121 coupled between the content management system 119a and a user device 120 can transmit data between the content management system 119a and the user device 120. As an example, the data can comprise a stream of content, such as a video stream, audio stream, metadata or data associated with the stream, and/or the like. As another example, the data can comprise a request for content from the user device 120.

In an aspect, the distribution system 116 and the network 121 can each include one or more networks or types of networks and communication links thereto capable of carrying communications, media content, and/or data signals between content provider at central location 101, content management system 119a and user device 120. As an example, the distribution system 116 and/or the network 121 can comprise a packet switched network (e.g., internet protocol based network), a non-packet switched network (e.g., quadrature amplitude modulation based network), and/or the like. The distribution system 116 and/or the network 121 can comprise network adapters, switches, routers, and the like connected through wireless links (e.g., radio frequency, satellite) and/or physical links (e.g., fiber optic cable, coaxial cable, Ethernet cable). In one aspect, the distribution system 116 and/or the network 121 can be configured to provide communication from telephone, cellular, modem, and/or other electronic devices to and throughout the system 100.

In an aspect, the content management system 119a can be in communication with one or more user devices 120 via the network 121. By way of example, the content management system 119a can be a personal computer, a portable computer, a smartphone, a server, a router, a network computer, a peer device or other common network node, and the like. As another example, the user device 120 can be a personal computer, communication terminal, set-top box, television, smartphone, laptop, tablet, GPS, vehicle entertainment system, multimedia playback device, portable electronic device, and the like. The user device 120 can be a widget or virtual device for displaying content in a picture-in-picture environment. In an aspect, the user device 120 does not need to be in a fixed location. In an aspect, a decoder can be coupled between the content management system 119a and the user devices 120 to decode the content for display on the user device 120.

In an aspect, the content management system 119a can be configured to store content. As an example, the content management system 119a can comprise a storage system 126 configured for storing a plurality of content (e.g., first content, second content) obtained from a content provider (e.g., central location 101). In an aspect, content can comprise playable content and content metadata. As an example, content metadata can comprise content title, content provider, content type (e.g. pay per view content, video on demand content), content format (e.g., digital, analog), content start point (e.g., temporal data for the start point of content), content end point (e.g. temporal data for the end point of content), content length (e.g., temporal data for the interval between content start point and content end point), content identifier (e.g., content id), content release date, content update frequency, content category (e.g. romance, comedy, etc.), content rating (e.g. PG, R, PG-13), the price for ordering the content, and the like. In an aspect, content metadata can further comprise metadata for the break points in the content. As an example, metadata for the break points can comprise temporal data for the start point and end point of an advertisement in the content, duration of the advertisement, type of the advertisement (e.g., local advertisement, non-local advertisement), release date of an advertisement, and the like.

In an aspect, the content management system 119a can comprise a processor 127 configured for determining one or more break points (e.g., start point or end point of an advertisement) in content. In an aspect, one or more break points can be identified by information contained in the content metadata. As an example, the content metadata can comprise temporal data for the start point and end point of an advertisement, duration of an advertisement, type of an advertisement (e.g., local advertisement, non-local advertisement), release date of an advertisement, and the like. As an example, the temporal data can be in terms of time offset with respect to the beginning of content. For example, a break point on fifteen minutes offset can indicate fifteen minutes after the beginning of the content. In an aspect, a break point can be characterized by a specific digital sequence. For example, the break point can comprise specific society of cable telecommunications engineers (SCTE) cue packets within a digital MPEG-2 content. As another example, a break point can be encoded cue tones identifying splice point within an analog content. As an example, the content management system 119a can selectively provide either the first content or the second content based on the break points and temporal data for the break points. Specifically, when the first content is being provided, at the time of the first break point in the first content, the second content at the time of the second break point can be provided.

System 100 may be implemented in various ways. For example, in an embodiment, central location 101 and content management system 119a can be hosted on different computer systems, and can communicate with each other through a network, for example, distribution system 116. In another embodiment, central location 101 and content management system 119a can be present on the same computer system, and thus may communicate with each other in an inter-computer manner. In an aspect, the methods and systems disclosed can be located within, or performed on, one or more central locations 101, distribution system 116, content management system 119a, network 121, and user device 120.

In an aspect, a gateway 119b can be implemented between the network 121 and the user device 120. As an example, the gateway 119b can comprise a personal computer, a portable computer, a smartphone, a server, a router, a network computer, a peer device or other common network node, and the like. In an aspect, the gateway 119b can be located at or close to a user premises. For example, the gateway 119b can be located at a neighborhood node. The gateway 119b can function as the content management system 119a. As an example, the first content and the second content can be delivered to the gateway 119b, and one or more break points can be determined at the gateway 119b. In an aspect, the gateway 119b can be configured to process portion replacement associated with the first content and the second content, as described in content management system 119a. The processed content (e.g., first content, second content) can be transmitted from the gateway device 119b to the user device 120.

Figure 2:
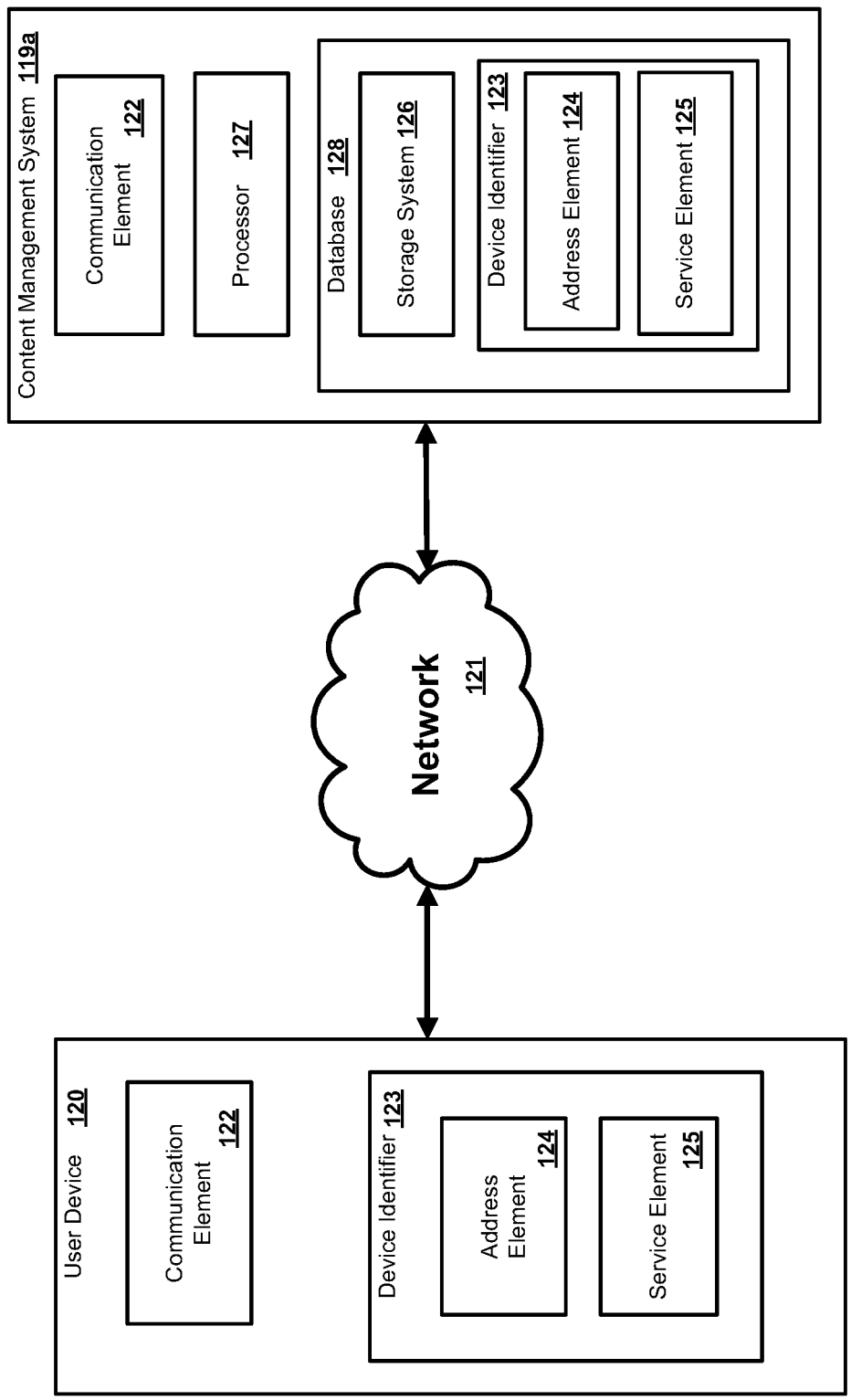
FIG. 2 is a block diagram of another exemplary system environment in which the present systems and methods can operate.

FIG. 2 illustrates an exemplary system environment in which the present systems and methods can operate. In an aspect, the content management system 119a can be in communication with user device 120. In an aspect, the content management system 119a can be disposed locally or remotely relative to the user device 120. As an example, the user device 120 and the content management system 119a can be in communication via a private and/or public network 121, such as the Internet or a local area network. Other forms of communications can be used, such as wired and wireless telecommunication channels.

As an example, the content management system 119a can be a personal computer, a portable computer, a smartphone, a server, a router, a network computer, a peer device, other common network node, and the like. As another example, the user device 120 can be an electronic device, such as a computer, a smartphone, a laptop, a tablet, a set top box, a display device, or other device capable of communicating with the content management system 119a.

In an aspect, the user device 120 and the content management system can comprise communication element 122 for providing an interface to a user to interact with the user device 120 and/or providing communicating between the user device 120 and the content management system 119a. In an aspect, the communication element 122 can be any interface for presenting and/or receiving information to/from the user, such as a user request for specific content. An example interface may be a communication interface, such as a web browser (e.g., Internet Explorer, Mozilla Firefox, Google Chrome, Safari, or the like). Other software, hardware, and/or interfaces can be used to provide communication between the user and the user device 120. In another aspect, the communication element 122 can request or query various files from a local source and/or a remote source. As an example, the communication element 122 of the user device 120 can transmit data from the user device 120 to a local or remote device, such as the content management system 119a. Specifically, the communication element 122 can transmit a request for content to the content management system 119a. As another example, the communication element 122 can transmit data (e.g., requested content) from the content management system 119a to the user device 120. As a further example, the communication element 122 of the content management system 119a can poll (e.g., interrogate, query, communicate with, etc.) a content provider (e.g., central location 101) to request specific content. For example, the content management system 119a can request a television episode series periodically (e.g., every hour, every day, every week, etc.) according to the content update frequency information contained in the content metadata.

In an aspect, the user device 120 can be associated with a user identifier or device identifier 123. As an example, the device identifier 123 can be any identifier, token, character, string, or the like, for differentiating one user or user device from another user or user device. In a further aspect, the device identifier 123 can identify a user or user device as belonging to a particular class of users or user devices. As a further example, the device identifier 123 can comprise information relating to the user device, such as a manufacturer, a model or type of device, a service provider associated with the user device 120, a state of the user device 120, a locator, and/or a label or classifier. Other information can be represented by the device identifier 123. In another aspect, the device identifier 123 can be received by the content management system 119a as part of the request for a specific content, so that the content management system 119a can provide the requested content to the user device 120 according to its respective device identifier 123.

In an aspect, the device identifier 123 can comprise an address element 124 and a service element 125. In an aspect, the address element 124 can comprise or provide an internet protocol address, a network address, a media access control (MAC) address, an Internet address, or the like. As an example, the address element 124 can be relied upon to establish a communication session between the user device 120 and the content management system 119a or other devices and/or networks. As a further example, the address element 124 can be used as an identifier or locator of the user device 120. In an aspect, the address element 124 can be persistent for a particular network. In another aspect, the address element 124 can be received by the content management system 119a as part of the request for a specific content, so that the content management system 119a can provide requested content to the user device 120 at its location according to the respective address element 124.

In an aspect, the service element 125 can comprise an identification of a service provider (e.g., internet service provider, video on demand service provider) associated with the user device 120 and/or with the class of user device 120. The class of the user device 120 can be related to a type of device, capability of device, type of service being provided, and/or a level of service (e.g., business class, service tier, service package, etc.). In an aspect, the address element 124 can be used to identify or retrieve data from the service element 125, or vice versa. As a further example, one or more of the address element 124 and the service element 125 can be stored remotely from the user device 120 and retrieved by one or more devices, such as the user device 120 or the content management system 119a. Other information can be represented by the service element 125. As an example, the service element 125 can associate a content request from the user device 120 with the content provider of the requested content to determine whether the user device 120 has entitlement for the requested content. The content management system 119a can provide content to the user device 120 if the user device 120 has entitlement for the requested content.

In an aspect, the content management system 119a can be a network device or server for communicating with the user device 120. As an example, the content management system 119a can communicate with the user device 120 for providing data and/or services. In an aspect, the content management system 119a can allow the user device 120 to interact with remote resources, such as data, devices, and files. As an example, the content management system 119a can be configured as (or disposed at) a central location (e.g., a headend, or processing facility), which can receive content (e.g., data, input programming) from multiple sources. The content management system 119a can combine the content from the multiple sources and can distribute the content to user (e.g., subscriber) locations via a distribution system.

In an aspect, the content management system 119a can manage the communication between the user device 120 and a database 128 for sending and receiving data therebetween. As an example, the database 128 can store a plurality of files (e.g., web pages), user identifiers or records, or other information. As a further example, the user device 120 can request and/or retrieve a file from the database 128. In an aspect, the database 128 can store information relating to the user device 120, such as the address element 124 and/or the service element 125. As an example, the content management system 119a can obtain the device identifier 123 from the user device 120 and retrieve information from the database 128, such as the address element 124 and/or the service elements 125. As a further example, the content management system 119a can obtain the address element 124 from the user device 120 and can retrieve the service element 125 from the database 128, or vice versa. Any information can be stored in and retrieved from the database 128. In an aspect, the content management system 119a can retrieve content stored in the database 128 upon request for the content from user device 120. For example, the database 128 can comprise a storage system 126 configured for storing content. The database 128 can be disposed remotely from the content management system 119a and accessed via direct or indirect connection. The database 128 can be integrated with the content management system 119a or some other device or system.

In an aspect, the storage system 126 can be configured for storing a playlist comprising data related to one or more portions in the content. In an aspect, data related to one or more portions can be obtained from content metadata. For example, the data related to one or more portions in a content can comprise content title, content provider, content format (e.g., digital, analog), content type (e.g., video on demand content, pay per view content), content start point (e.g., temporal data for start point of content), content end point (e.g. temporal data for end point of content), content length (e.g., temporal data for the interval between content start point and content end point), content identifier (e.g., content id), content release date, content update frequency, content category (e.g. romance, comedy, etc.), content rating (e.g. PG, R, PG-13), the price for ordering the content, potion type (e.g., advertisement, movie preview, alternative scene), portion provider (e.g., local advertisement, non-local advertisement), portion release date, portion identifier (e.g., portion id), portion format (e.g., digital, analog), portion start point (e.g., temporal data for start point of a portion), portion end point (e.g., temporal data for end point of a portion), portion length (e.g., temporal data for portion duration) and the like.

In an aspect, the content management system 119a can comprise a processor 127. The processor 127 can be configured to process content. In an aspect, the processor 127 can be configured to determine one or more break points in content according to the content metadata. For example, the processor 127 can be configured to determine one or more break points in a first content and a second content, and selectively provide either the first content or the second content to the user device 120 based on the break points and temporal data for the break points contained in the content metadata. As an example, the first content can be the first episode of a television program series. The second content can be the second episode of the television program series. In an aspect, the first content can comprise a first break point and a third break point. The first break point can comprise a start point for an advertisement in the first content, and the third break point can comprise an end point for the advertisement in the first content. The second content can comprise a second break point and fourth break point. The second break point can comprise a start point for an advertisement in the second content, and the fourth break point can comprise an end point for the advertisement in the second content. When the first content is requested by the user device 120, the processor 127 can provide the first content until the first break point, then provide the second content at the second break point in place of the first break point, and then provide the first content at the third break point in place of the second content at the fourth breakpoint.

Figure 3:
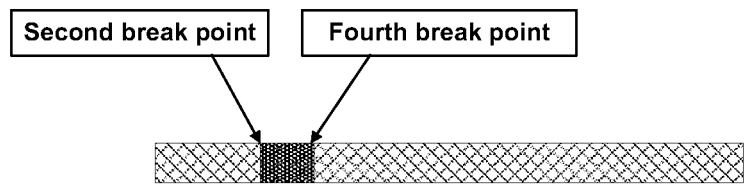
FIG. 3 is a diagram illustrating exemplary structure of content according to systems and methods disclosed herein.
Figure 3:
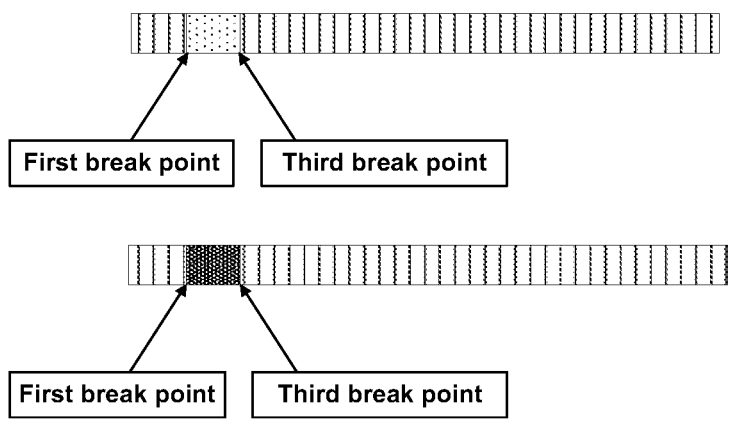
Figure 3:
Figure 3:

FIG. 3 is a diagram illustrating exemplary structures of content according to the methods and systems disclosed herein. As shown in FIG. 3, first content (e.g., the first episode of a television program) can comprise a first portion (e.g., an advertisement) and second content (e.g., the second episode of a television program) can comprise a second portion (e.g., an advertisement). In an aspect, a portion can be an advertisement, or it can be an alternative scene (e.g., alternative ending, alternative rating scene, and the like). In an aspect, the second portion in the second content can be more recent in time than the first portion in the first content. For example, the second portion in the second content can be a newer version or updated version of the first portion in the first content. In an aspect, the first content can comprise a first break point and a third break point as the start point and end point of the first portion in the first content. In another aspect, the second content can comprise a second break point and a fourth break point as the start point and end point of the second portion in the second content.

When the first content is being provided, for example, via a time shifted method such as video on-demand or a linear method such as pay-per view service, the portion in the second content (e.g., the second portion) can be played in lieu of the portion in the first content (e.g., first portion). In an aspect, the first content and the second content can be stored in a network device or system between, and/or including, the distribution system 116 and the user device 120. For example, the first content and the second content can be stored in the content management system 119a (e.g., storage system 126) and/or gateway 119b. When the first content is requested by a user device 120, the system, (e.g., the processor 127) can retrieve the first content and the second content from the storage system 126 and determine the first and third break points in the first content, and the second and fourth break points in the second content. The system can provide the first content until the first break point (e.g., the start point of the first portion), and then provide the second content at the second break point (e.g., the start point of the second portion) in place of the first content at the first break point (e.g., the start point of the first portion). The system (e.g., the process 127) can further provide the first content at the third break point (e.g., the end point of the first portion) in place of the second content at the fourth break point (e.g., the end point of the second portion). As such, the first portion in the first content can be replaced by the second portion in the second content when the first content is provided.

In an aspect, a content creator (e.g., content provider 101) can send first content (e.g., first episode of a television program) with one or more portions (e.g., a first portion) at a first time point. The content creator (e.g., content provider 101) can send second content (e.g., second episode of the television program) with one or more portions (e.g., second portion) at a second time point. If a user requests the first content at or after the second time point, some of all portions in the first content can be replaced by respective some or all portions in the second content.

In another aspect, a content creator (e.g., content provider 101) can send the first content (e.g., first episode of a television program) with one or more portions (e.g., a first portion) at a first time point. The content creator (e.g., content provider 101) can send second content (e.g., second episode of the television program) with one or more portions (e.g., second portion) at a second time point. There can be a third time point later than the second time point. If the first content is viewed between the second time point and the third time point, the first portion in the first content can be replaced with the second portion in the second content. If the first content is viewed after the third time point, then a requirement to replace the first portion in the first content with the second portion in the second content expires, and the content management system 119a and/or the gateway 119b can replace the first portion in the first content with any other available portions (e.g., a third portion newer in time than the second portion).

Figure 4:
FIG. 4 is a diagram illustrating exemplary structure of content according to the systems and methods disclosed herein.
Figure 4:
Figure 4:
Figure 4:
Figure 4:
Figure 4:
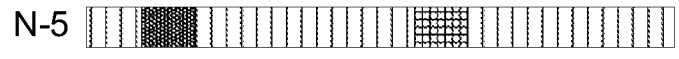
Figure 4:
Figure 4:

FIG. 4 is a diagram illustrating exemplary structures of content according to the systems and methods disclosed herein. As an example, content N, N-1, N-2, N-3, N-4 and N-5 represent respectively the sixth, fifth, fourth, third, second and first content. Content N is the newest content in time and N-5 is the oldest content in time. As an example, each of the content N, N-1, N-2, N-3, N-4 and N-5 can comprise a plurality of portions (e.g., first portion, second portion). By implementing the methods and systems described herein, when older content N-1, N-2, N-3, N-4 or N-5 are accessed or provided, particular portions in newest content N can be played at the break points specific to the respective older content (e.g., instead of portions in older content).

In an aspect, the first portion and the second portion in the content N, N-1, N-2, N-3, N-4 and N-5 can occur at the same point in time within the content N, N-1, N-2, N-3, N-4 and N-5. In another aspect, the first portion and the second portion can occur at different point in time within the content N, N-1, N-2, N-3, N-4 and N-5, as shown in FIG. 4.

In an aspect, a playlist (e.g., a manifest file) comprising data related to the portions of content N, N-1, N-2, N-3, N-4 and N-5 can be generated. The playlist can be updated when new content becomes available. In an aspect, the portions in the newest content can be stored at the top of the playlist. The portions at the top of the playlist (e.g., the advertisement newest in time) can be accessed when content older in time is accessed. In an aspect, the playlist can be stored in the storage system 126 of the content management system 119a.

In an aspect, a check can be performed to determine if a user device (e.g., user device 102) is part of a content replacement system and/or a user has subscribed to a content replacement service. As an example, the check can be performed at the content management system 109a and/or gateway 109b. If the user device (e.g., user device 102) is part of the replacement system and/or the user has subscribed to the content replacement service, steps in FIG. 5, FIG. 6 and FIG. 7 can be performed. If the user device (e.g., user device 102) is not part of the content replacement system and/or the user did not subscribe to the content replacement service, steps in FIG. 5, FIG. 6 and FIG. 7 will not be performed. In an aspect, a user can have an option of tuning on and tuning off the content replacement service at any time for any content.

Figure 5:
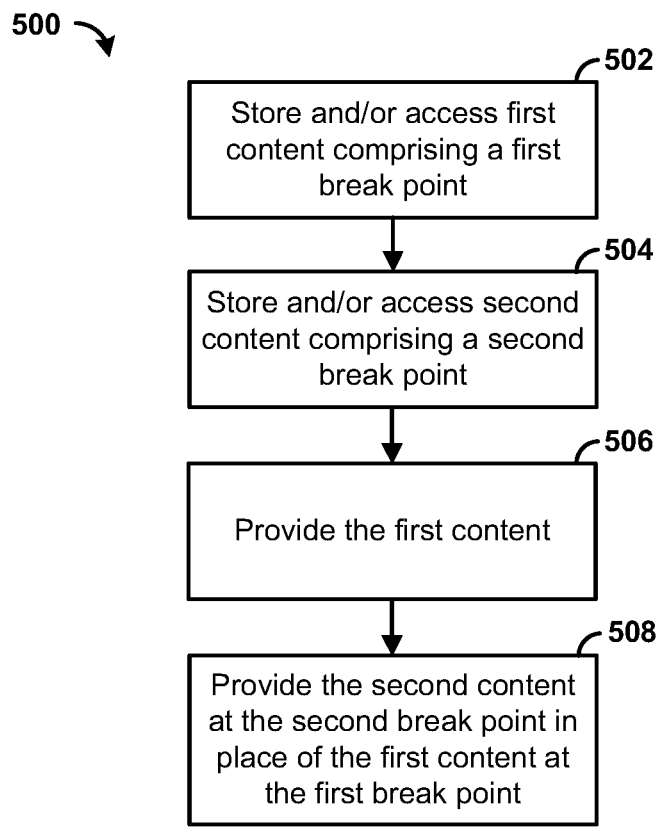
FIG. 5 is a flowchart for illustrating an exemplary method for providing content.

FIG. 5 is a flowchart illustrating an example method 500 for providing content. At step 502, first content can be created, accessed and/or stored. In an aspect, the first content can be obtained from a content provider (e.g., via central location 101) and stored in the content management system 119a, for example, in the content storage system 126. As an example, the content can be a television program, a movie, or the like. The first content can be the first episode of a television program series. As an example, the metadata can comprise content title, content provider, content format (e.g., digital, analog), content type (e.g., video on demand content, pay per view content), content start point (e.g., temporal data for start point of content, temporal data for start point of portions in content), content end point (e.g. temporal data for end point of content, temporal data for end point of portions in content), content length (e.g., temporal data for the interval between content start point and content end point), content identifier (e.g., content id), content release date, content update frequency, content category (e.g. romance, comedy, etc.), content rating (e.g. PG, R, PG-13), the price for ordering the content, and the like.

In an aspect, the first content can comprise a first break point and a third break point (see, e.g., FIG. 3). For example, the first break point can be the start point of an advertisement or a movie preview in the first content, and the third break point can be the end point of the advertisement or a movie preview. Accordingly, the content metadata can further comprise temporal data for the break points (e.g., start point, end point), type of content between break points (e.g., advertisement, movie preview, alternative scene), length of content between break points, and the like. As an example, alternative scene can comprise alternative ending, alternative actor, alternative product object, and the like.

At step 504, second content can be received, accessed or stored. In an aspect, the second content can be obtained from a content provider (e.g., via central location 101) and stored in the content management system 119*a*, for example, in the content storage system 126. As an example, the second content can be a television program, a movie, or the like. The second content can be the second episode of a television program series. As another example, the second content can be the same content program (e.g., the same episode) as the first content, but with an alternative ending or an alternative object in a scene. In an aspect, the metadata of the second content can be stored. As an example, the metadata can comprise content title, content provider, content format (e.g., digital, analog), content type (e.g., video on demand content, pay per view content), content start point (e.g., temporal data for start point of content), content end point (e.g. temporal data for end point of content), content length (e.g., temporal data for the interval between content start point and content end point), content identifier (e.g., content id), content release date, content update frequency, content category (e.g. romance, comedy, etc.), content rating (e.g. PG, R, PG-13), the price for ordering the content, and the like.

In an aspect, the second content can comprise a second break point and a fourth break point (see, e.g., FIG. 3). For example, the second break point can be the start point of an advertisement or a movie preview in the second content, and the fourth break point can be the end point of the advertisement or a movie preview. Accordingly, the content metadata can further comprise temporal data for the break points (e.g., start point, end point), type of content between break points (e.g., advertisement, movie preview, alternative scene), length of content between break points, and the like.

At step 506, the first content can be provided. In an aspect, the first content stored in the storage system 126 of the content management system 119*a*, or elsewhere in the network (e.g., gateway 119*b*) can be provided to the user device 120. As an example, the first content can be provided upon request by a user device 120. For example, the first content can be the first episode of a television program. In an aspect, the first content can comprise first break point (e.g., the start point of an advertisement or a movie preview in the first content). The first content can be provided until the first break point is detected. In an aspect, the first break point can be detected by the processor 127 according to the metadata of the first content.

At step 508, the second content at the second break point can be provided in place of the first content at the first break point. For example, the first content can be provided until the first break point (e.g., the start point of an advertisement or a movie preview in the first content). Then the second content at the second break point (e.g., the start point of an advertisement or a movie preview in the second content) can be provided in place of the first content at the first break point (e.g., the start point of an advertisement in the first content). In an aspect, the advertisement or movie preview in the second content can be more recent in time or an updated version of the advertisement or movie preview in the first content. In an aspect, the first break point can be detected by the processor 127 according to the metadata of the first content. The second break point can be detected by the processor 127 according to the metadata of the second content. Then the first content can be provided at the third break point (e.g., the end point of an advertisement or a movie preview in the first content) in place of the second content at the fourth break point (e.g., the end point of an advertisement or a movie preview in the second content). As such, the advertisement or the movie preview, or another portion (e.g. a different scene) in the first content can be replaced by the advertisement or the movie preview, or another portion (e.g., a different scene) in the second content when the first content is provided. In another aspect, the one or more portions (e.g., advertisements, alternative scenes) of the first content can be replaced by the respective one or more portions (e.g., advertisements, alternative scenes) of the second content in the content management system 119*a* or gateway 119*b*, prior to providing the first content.

Figure 6:
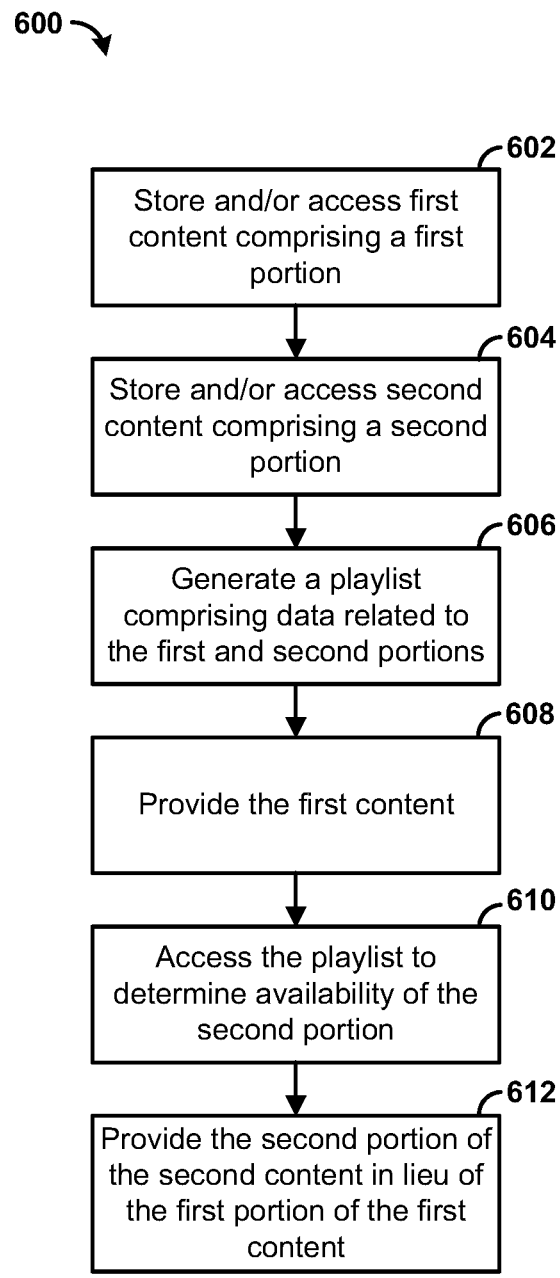
FIG. 6 is a flowchart for illustrating another exemplary method for providing content.

FIG. 6 is a flowchart illustrating another example method 600 for providing content. At step 602, first content can be accessed, received and/or stored. In an aspect, the first content can be obtained from a content provider (e.g., central location 101 or another source such as a content distribution network) and stored in the content storage system 126 of the content management system 119*a*. As an example, the content can be a television program, a movie, or the like. The first content can be the first episode of a television program series. In an aspect, the metadata of the first content can be stored. As an example, the metadata can comprise content title, content provider, content format (e.g., digital, analog), content type (e.g., video on demand content, pay per view content), content start point (e.g., temporal data for start point of content), content end point (e.g. temporal data for end point of content), content length (e.g., temporal data for the interval between content start point and end point of content), content identifier (e.g., content id), content release date, content update frequency, content category (e.g. romance, comedy, etc.), content rating (e.g. PG, R, PG-13), the price for ordering the content, and the like.

In an aspect, the first content can comprise a portion identified between a first break point and a third break point. For example, the first break point can be the start point of a portion (e.g., advertisement, movie preview, alternative scene) in the first content, and the third break point can be the end point of the portion (e.g., advertisement, movie preview, alternative scene). Accordingly, the content metadata of the first content can further comprise metadata for a portion and break point in the first content. As an example, the metadata can comprise temporal data for the break points (e.g., first point, third point), potion type (e.g., advertisement, movie preview, alternative scene), portion provider (e.g., local advertisement, non-local advertisement), portion release date, portion identifier (e.g., portion id), portion format (e.g., digital, analog), portion start point (e.g., temporal data for start point of a portion), portion end point (e.g., temporal data for end point of a portion), portion length (e.g., temporal data for portion duration), and the like.

At step 604, second content can be accessed, received and/or stored. In an aspect, the second content can be obtained from a content provider (e.g., central location 101) and stored in the content management system 119*a*. Specifically, the second content can be stored in the storage system 126 of the content management system 119*a*. As an example, the content can be a television program, a movie, or the like. As an example, the second content can be the second episode of a television program. The second content can be newer or more recent in time than the first content. In an aspect, the metadata of the second content can be stored. As an example, the metadata can comprise content title, content provider, content format (e.g., digital, analog), content type (e.g., video on demand content, pay per view content), content start point (e.g., temporal data for start point of content), content end point (e.g. temporal data for end point of content), content length (e.g., temporal data for the interval between content start point and content end point), content identifier (e.g., content id), content release date, content update frequency, content category (e.g. romance, comedy, etc.), content rating (e.g. PG, R, PG-13), the price for ordering the content, and the like.

In an aspect, the second content can comprise a portion identified between a second break point and a fourth break point. For example, the second break point can be the start point of an advertisement, an alternative scene, or movie preview in the second content. The fourth break point can be the end point of the advertisement or movie preview. In an aspect, the portion (e.g., advertisement, movie preview) in the second content can be different from the portion (e.g., advertisement, movie preview) in the first content. Accordingly, the content metadata of the second content can further comprise metadata for a portion and break points in the second content. As an example, the metadata can comprise temporal data for the break points (e.g., second point, fourth point), potion type (e.g., advertisement, movie preview, alternative scene), portion provider (e.g., local advertisement, non-local advertisement), portion release date, portion identifier (e.g., portion id), portion format (e.g., digital, analog), portion start point (e.g., temporal data for start point of a portion), portion end point (e.g., temporal data for end point of a portion), portion length (e.g., temporal data for portion duration), and the like.

At step 606, a playlist or a manifest file comprising data related to the first and second portions can be generated. In an aspect, data relating to the first and second portions can be obtained from the metadata of the first content and the second content. As an example, content metadata can comprise content start points, content end points, content length, content title, content provider, content type (e.g., pay per view content, video on demand content), content format (e.g., digital, analog), content identifier (e.g., content id), content release date, content update frequency, content category (e.g. romance, comedy, etc.), content rating (e.g. PG, R, PG-13), the price for ordering the content, potion type (e.g., advertisement, movie preview, alternative scene), portion provider (e.g., local advertisement, non-local advertisement), portion release date, portion identifier (e.g., portion id), portion format (e.g., digital, analog), portion start point (e.g., temporal data for start point of a portion), portion end point (e.g., temporal data for end point of a portion), portion length (e.g., temporal data for portion duration), and the like. In an aspect, the temporal data can be in terms of time offset with respect to the beginning of content. For example, a break point (e.g., start point, end point) on fifteen minutes offset can indicate fifteen minutes after the beginning of content.

In an aspect, the playlist can be dynamically updated. As an example, when new content becomes available, the playlist can be updated with data relating to one or more portions in the new content. The data relating to one or more portions in the new content can be obtained from the metadata of the new content. In an aspect, the data related to the portion newest in time can be stored at the top of the playlist. The portion at the top of the playlist (e.g., the advertisement or movie preview newest in time) can be accessed and played when content is provided.

At step 608, the first content can be provided. In an aspect, the first content stored in the storage system 126 can be provided to the user device 120. As an example, the first content can be provided upon request by a user device 120. For example, the first content can be the first episode of a television program requested by a viewer. In an aspect, the first content can comprise a first break point (e.g., the start point of the portion in the first content). The first content can be provided until the first break point is detected. In an aspect, the first break point can be detected by the processor 127 according to the metadata of the first content. The first content can further comprise a third break point (e.g., the end point of the portion in the first content).

At step 610, the playlist can be accessed to determine availability of the second portion. In an aspect, the content creator or another entity such as an advertise provider may intend for the second portion to be played in lieu of the first portion when the first content is being provided. For example, the first and second portion can be advertisements, alternative scenes, or movie previews. In an aspect, the second portion can be more recent in time than the first portion. In another aspect, the second portion can be a local advertisement designed to target local viewers or listeners, whereas the first portion may be a generic or national/regional advertisement. For example, when a local viewer or listener is requesting a specific content, the content provider may intend for the second portion to be played. As a result, the playlist can be accessed or consulted to determine if the second portion is available. As an example, the processor 127 can access the playlist stored in the storage system 126 to determine if the second portion is available. In an aspect, a specific portion can be identified by the metadata associated with the portion. For example, the metadata of a portion can comprise potion type (e.g., advertisement), portion provider (e.g., local advertisement, non-local advertisement), portion release date, portion identifier (e.g., portion id), portion format (e.g., digital, analog), portion start point (e.g., temporal data for start point of a portion), portion end point (e.g., temporal data for end point of a portion), portion length (e.g., temporal data for portion duration), and the like.

At step 612, the second portion of the second content can be provided in lieu of the first portion of the first content. For example, the advertisement, alternative scene, or movie preview in the second content can be provided in lieu of the advertisement or movie preview in the first content. As an example, the second portion can be accessed from the playlist by the processor 127 and provided in lieu of the first portion. After the second portion is provided, the first content at the end point of the first portion (e.g., the third break point) can be provided.

Figure 7:
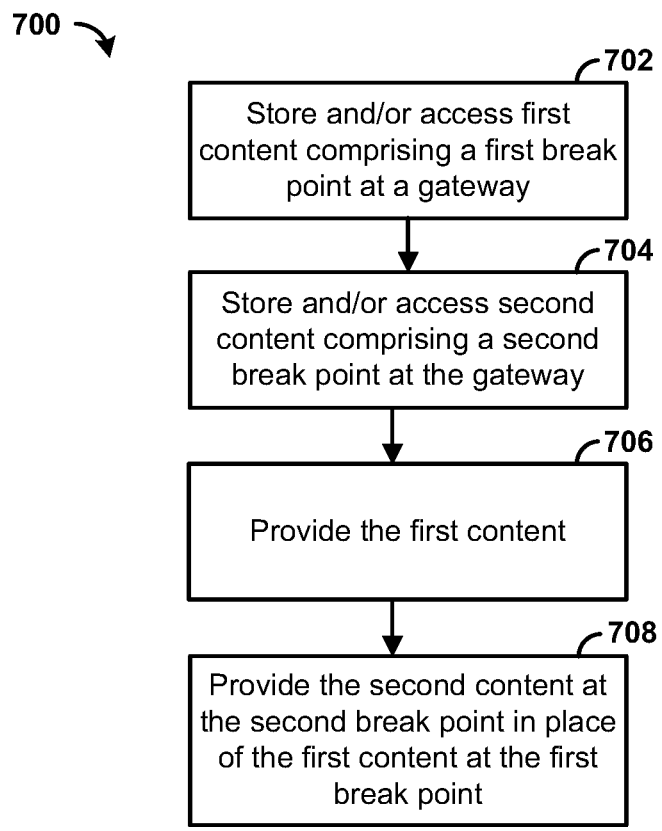
FIG. 7 is a flowchart for illustrating another exemplary method for providing content.

FIG. 7 is a flowchart illustrating an example method 700 for providing content. At step 702, first content can be created, accessed and/or stored at a gateway. In an aspect, the gateway (e.g., gateway 119*b*) can be located at and/or near a user premises. For example, the gateway can service a user or multiple users (e.g., neighborhood). In an aspect, the first content can be obtained from a content provider (e.g., via central location 101) and stored in the gateway (e.g., gateway 119*b*). As an example, the content can be a television program, a movie, or the like. The first content can be the first episode of a television program series. As an example, the metadata can comprise content title, content provider, content format (e.g., digital, analog), content type (e.g., video on demand content, pay per view content), content start point (e.g., temporal data for start point of content, temporal data for start point of portions in content), content end point (e.g. temporal data for end point of content, temporal data for end point of portions in content), content length (e.g., temporal data for the interval between content start point and content end point), content identifier (e.g., content id), content release date, content update frequency, content category (e.g. romance, comedy, etc.), content rating (e.g. PG, R, PG-13), the price for ordering the content, and the like.

In an aspect, the first content can comprise a first break point and a third break point (see, e.g., FIG. 3). For example, the first break point can be the start point of an advertisement or a movie preview in the first content, and the third break point can be the end point of the advertisement or a movie preview. Accordingly, the content metadata can further comprise temporal data for the break points (e.g., start point, end point), type of content between break points (e.g., advertisement, movie preview, alternative scene), length of content between break points, and the like. As an example, an alternative scene can comprise alternative ending, alternative actor, alternative product object, and the like.

At step 704, second content can be received, accessed or stored at the gateway. In an aspect, the gateway (e.g., gateway 119*b*) can be located at a user premises. In an aspect, the second content can be obtained from a content provider (e.g., via central location 101) and stored at the gateway (e.g., gateway 119*b*). As an example, the second content can be a television program, a movie, or the like. The second content can be the second episode of a television program series. As another example, the second content can be the same content program (e.g., the same episode) as the first content, but with an alternative ending or an alternative object in a scene. In an aspect, the metadata of the second content can be stored. As an example, the metadata can comprise content title, content provider, content format (e.g., digital, analog), content type (e.g., video on demand content, pay per view content), content start point (e.g., temporal data for start point of content), content end point (e.g. temporal data for end point of content), content length (e.g., temporal data for the interval between content start point and content end point), content identifier (e.g., content id), content release date, content update frequency, content category (e.g. romance, comedy, etc.), content rating (e.g. PG, R, PG-13), the price for ordering the content, and the like.

In an aspect, the second content can comprise a second break point and a fourth break point (see, e.g., FIG. 3). For example, the second break point can be the start point of an advertisement or a movie preview in the second content, and the fourth break point can be the end point of the advertisement or a movie preview. Accordingly, the content metadata can further comprise temporal data for the break points (e.g., start point, end point), type of content between break points (e.g., advertisement, movie preview, alternative scene), length of content between break points, and the like.

At step 706, the first content can be provided. In an aspect, the first content stored in the gateway (e.g., gateway 119*b*) or elsewhere in the network can be provided to the user device 120. As an example, the first content can be provided upon request by a user device 120. For example, the first content can be the first episode of a television program. In an aspect, the first content can comprise first break point (e.g., the start point of an advertisement or a movie preview in the first content). The first content can be provided until the first break point is detected. In an aspect, the first break point can be detected by a processor in the gateway 119*b* according to the metadata of the first content.

At step 708, the second content at the second break point can be provided in place of the first content at the first break point. For example, the first content can be provided until the first break point (e.g., the start point of an advertisement or a movie preview in the first content). Then the second content at the second break point (e.g., the start point of an advertisement or a movie preview in the second content) can be provided in place of the first content at the first break point (e.g., the start point of an advertisement in the first content). In an aspect, the advertisement or movie preview in the second content can be more recent in time or an updated version of the advertisement or movie preview in the first content. In an aspect, the first break point can be detected by a processor in the gateway 119*b* according to the metadata of the first content. The second break point can be detected by the processor in the gateway 119*b* according to the metadata of the second content. Then the first content can be provided at the third break point (e.g., the end point of an advertisement or a movie preview in the first content) in place of the second content at the fourth break point (e.g., the end point of an advertisement or a movie preview in the second content). As such, the advertisement or the movie preview, or another portion (e.g. a different scene) in the first content can be replaced by the advertisement or the movie preview, or another portion (e.g., a different scene) in the second content when the first content is provided. In another aspect, the one or more portions (e.g., advertisements, alternative scenes) of the first content can be replaced by the respective one or more portions (e.g., advertisements, alternative scenes) of the second content in the gateway 119*b*, for example, prior to providing the first content.

Figure 8:
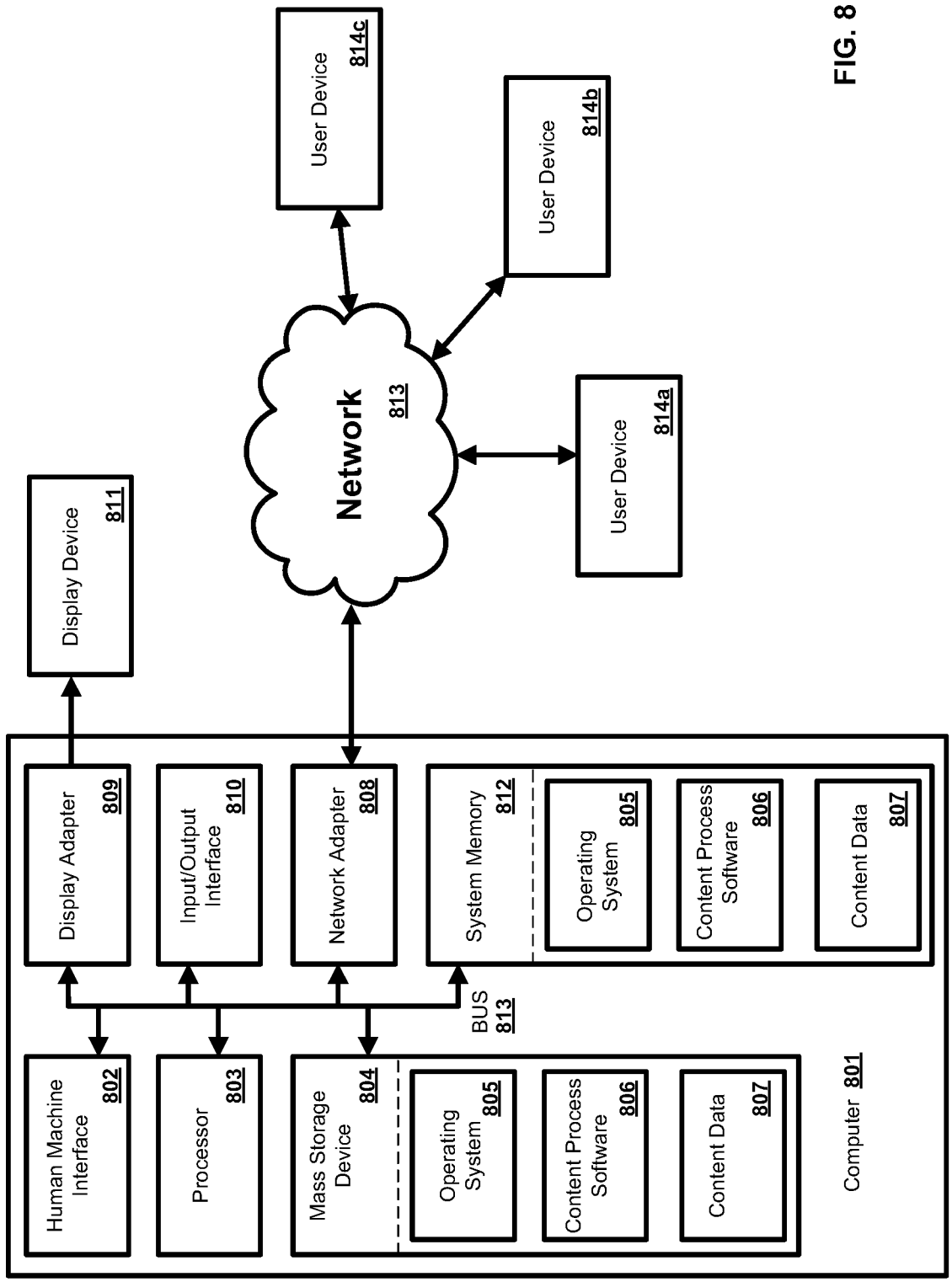
FIG. 8 is a block diagram of an exemplary system in which the present systems and methods can operate.

In an exemplary aspect, the methods and systems can be implemented on a computer 801 as illustrated in FIG. 8 and described below. By way of example, content management system 119*a* of FIG. 1 and FIG. 2 can be a computer 801 as illustrated in FIG. 8. The user device 120 of FIG. 1 and FIG. 2 can be user devices 814*a*, 814*b*, 814*c* as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, content process software 806, content data 807, a network adapter 808, system memory 812, an Input/Output Interface 810, a display adapter 809, a display device 811, and a human machine interface 802, can be contained within one or more user devices 814a, b, c at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data, such as content data 807, and/or program modules, such as operating system 805 and content process software 806, that are immediately accessible to and/or are presently operated on by the processing unit 803.

In another aspect, the computer 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computer 801. For example and not meant to be limiting, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and content process software 806. Each of the operating system 805 and content process software 806 (or some combination thereof) can comprise elements of the programming and the content process software 806. Content process data 807 can also be stored on the mass storage device 804. Content data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components, such as speakers (not shown) and a printer (not shown) which can be connected to the computer 801 via Input/Output Interface 810. Any step and/or result of the methods can be output in any form to an output device. Such output can be any form of visual representation, including, but not limited to, textual, graphical, animation, audio, tactile, and the like. The display 811 and computer 801 can be part of one device, or separate devices.

The computer 801 can operate in a networked environment using logical connections to one or more user devices 814a, b, c. By way of example, the computer 801 can be a personal computer, a portable computer, a smartphone, a server, a router, a network computer, a peer device or other common network node, and so on. As another example, the user devices 814a, b, c can comprise Logical connections between the computer 801 and a user device 814a, b, c can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 805, are illustrated herein as discrete blocks, although it is recognized that such programs and components reside at various times in different storage components of the computing device 801, and are executed by the data processor(s) of the computer. An implementation of content process software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving, by a computing device and from a user device, a request for a first episode of content;
determining, based on the request for the first episode of the content, a second episode of the content, wherein the second episode is more recent than the first episode;
determining a start point and an end point within the first episode of the content;
determining a second start point and a second end point within the second episode of the content;
sending, to the user device, a first portion of the first episode of the content until the start point is reached;
sending, to the user device and based on the second episode being more recent than the first episode, at least a portion of the second episode of the content from the second start point to the second end point; and
sending, to the user device and based on the second end point of the second episode being reached, a second portion of the first episode from the end point of the first episode.

2. The method of claim 1, wherein the start point is determined based on a first cue packet in the first episode and the end point is determined based on a second cut packet in the first episode.

3. The method of claim 1, wherein determining the start point and the end point comprises determining, based on metadata associated with the first episode of the content, the start point and the end point.

4. The method of claim 1, further comprising determining the second episode of the content is a newest episode of the content.

5. The method of claim 1, further comprising:
determining a third portion of the first episode of the content between the start point and the end point; and
replacing the third portion of the first episode of the content with the at least the portion of the second episode of the content.

6. The method of claim 1, further comprising:
determining a third episode of the content associated, wherein the third episode is more recent than the first episode and the second episode; and
generating, at a playlist, an indication that the third episode of the content is a newest episode of the content.

7. The method of claim 1, further comprising generating a manifest facilitating access to the first portion of the first episode and the at least the portion of the second episode.

8. One or more non-transitory computer-readable media storing processor-executable instructions that, when executed by at least one processor, cause the at least one processor to:
receive, from a user device, a request for a first episode of content;
determine, based on the request for the first episode of the content, a second episode of the content, wherein the second episode is more recent than the first episode;
determine a start point and an end point within the first episode of the content;
determine a second start point and a second end point within the second episode of the content;
send, to the user device, a first portion of the first episode of the content until the start point is reached;
send, to the user device and based on the second episode being more recent than the first episode, at least a portion of the second episode of the content from the second start point to the second end point; and
send, to the user device and based on the second end point of the second episode being reached, a second portion of the first episode from the end point of the first episode.

9. The one or more non-transitory computer-readable media of claim 8, wherein the processor-executable instructions that, when executed by the at least one processor, cause the at least one processor to determine the start point and the end point within the first episode, cause the at least one processor to determine the start point based on a first cue packet in the first episode and the end point based on a second cue packet in the first episode.

10. The one or more non-transitory computer-readable media of claim 8, wherein the processor-executable instructions that, when executed by the at least one processor, cause the at least one processor to determine the start point and the end point, cause the at least one processor to determine, based on metadata associated with the first episode of the content, the start point and the end point.

11. The one or more non-transitory computer-readable media of claim 8, wherein the processor-executable instructions, when executed by the at least one processor, further cause the at least one processor to determine the second episode of the content is a newest episode of the content.

12. The one or more non-transitory computer-readable media of claim 8, wherein the processor-executable instructions, when executed by the at least one processor, further cause the at least one processor to:
   determine a third portion of the first episode of the content between the start point and the end point; and
   replace the third portion of the first episode of the content with the at least the portion of the second episode of the content.

13. The one or more non-transitory computer-readable media of claim 8, wherein the processor-executable instructions, when executed by the at least one processor, further cause the at least one processor to:
   determine a third episode of the content, wherein the third episode is more recent than the first episode and the second episode; and
   generate, at a playlist, an indication that the third episode of the content is a newest episode of the content.

14. The one or more non-transitory computer-readable media of claim 8, wherein the processor-executable instructions, when executed by the at least one processor, further cause the at least one processor to generate a manifest facilitating access to the first portion of the first episode and the at least the portion of the second episode.

15. A system comprising:
   a computing device configured to:
      receive, from a user device, a request for a first episode of content;
      determine, based on the request for the first episode of the content, a second episode of the content, wherein the second episode is more recent than the first episode;
      determine a start point and an end point within the first episode of the content;
      determine a second start point and a second end point within the second episode of the content;
      send, to the user device, a first portion of the first episode of the content until the start point is reached;
      send, to the user device and based on the second episode being more recent than the first episode, at least a portion of the second episode of the content from the second start point to the second end point; and
      send, to the user device and based on the second end point of the second episode being reached, a second portion of the first episode from the end point of the first episode; and
   the user device configured to:
      send the request for the first episode of the content;
      receive the first portion of the first episode of the content until the start point is reached; and
      receive the at least the portion of the second episode of the content from the second start point to the second end point.

16. The system of claim 15, wherein the computing device is configured to determine the start point based on a first cue packet in the first episode and the end point based on a second cue packet in the first episode.

17. The system of claim 15, wherein the computing device is configured to determine the start point and the end point by the computing device being configured to determine, based on metadata associated with the first episode of the content, the start point and the end point.

18. The system of claim 15, wherein the computing device is further configured to determine the second episode of the content is a newest episode of the content.

19. The system of claim 15, wherein the computing device is further configured to:
   determine a third portion of the first episode of the content between the start point and the end point; and
   replace the third portion of the first episode of the content with the at least the portion of the second episode of the content.

20. The system of claim 15, wherein the computing device is further configured to:
   determine a third episode of the content, wherein the third episode is more recent than the first episode and the second episode; and
   generate, at a playlist, an indication that the third episode of the content is a newest episode of the content.

21. The system of claim 15, wherein the computing device is further configured to generate a manifest facilitating access to the first portion of the first episode and the at least the portion of the second episode.

* * * * *